Jan. 6, 1970   E. E. CLINE   3,487,722
HARMONIC DRIVE AND METHOD FOR CONTROLLING SPEED
Filed March 6, 1968   2 Sheets-Sheet 1

INVENTOR.
ERNEST E. CLINE
BY *Bair, Freeman*
*& Molinare*
ATTORNEYS

OPERATING AT
NORMAL CONSTANT
SPEED

SPEED-UP

SLOW-DOWN

INVENTOR.
ERNEST E. CLINE
BY Bair, Freeman
& Molinare
ATTORNEYS

United States Patent Office 3,487,722
Patented Jan. 6, 1970

3,487,722
HARMONIC DRIVE AND METHOD FOR CONTROLLING SPEED
Ernest E. Cline, Hanover Park, Ill., assignor to Web Press Engineering, Inc., a corporation of Illinois
Filed Mar. 6, 1968, Ser. No. 710,796
Int. Cl. F16h *37/06*
U.S. Cl. 74—675
4 Claims

ABSTRACT OF THE DISCLOSURE

An arrangement and method for accurately varying the speed of a roll or rotating element which is rotating at a high speed. The arrangement includes a flexible spline member which encloses a wave generator and which is surrounded by a rigid circular spline member; the splines of the two spline members engaging each other and the circular spline member being located within and drivingly engaging the roll or rotating element. A first drive rotates at a constant predetermined speed and drives the flexible spline member. The flexible spline member, in turn, drives the circular spline member and the roll or rotating element at a normally constant predetermined speed. The last mentioned normally constant predetermined speed of the roll or rotating element may be varied by driving the wave generator at selectively variable speeds while the first drive continues to rotate at the first mentioned constant predetermined speed.

BACKGROUND OF THE INVENTION

This invention relates to an arrangement and method for varying the speed of a rotating element and, more particularly, to a compact arrangement and a method for accurately varying the speed of a roll while the roll is in high speed dynamic rotation.

In United States Patent No. 2,906,143 a harmonic drive speed reduction gear arrangement is shown. That gear arrangement, as shown, comprises a non-circular wave generator surrounded by a flexible spline member having splines extending outwardly therefrom. Surrounding the flexible spline member is a rigid circular spline having a slightly greater number of radially inwardly extending splines which engage the splines of the flexible spline member in the region where the latter spline member is deformed by the non-circular wave generator.

In operation, one of the three elements acts as a drive element and the motion of the drive element is transmitted, via a wave form occurring in the flexible spline member, to one of the other elements, the latter being a driven element. The third of the elements is fixed. Since the motion is transmitted in a wave form rather than by direct rotating engagement of teeth of a pair of rotating elements, as in a gear arrangement of conventional design, the speed of the driven element is a function of the speed of propagation of the wave form of the flexible spline member and not the rotational speed of the flexible spline member per se.

To be more specific, where the wave generator of the arrangement described in the above mentioned patent is the drive element, the rigid circular spline is the driven element and the flexible spline member is the fixed element, the speed reduction ratio realized is expressed by the formula $$R = N_f / (N_f - N_r)$$

where:

R = speed ratio;
$N_f$ = number of splines on the flexible spline member; and
$N_r$ = number of splines on the flexible spline member;
ber.

The gear arrangement described is useful for either increasing or reducing the speed of a rotating element with relation to the speed of a power input source. However, such speed increase or reduction is constant and no provision is made for variably changing the speed of the output and, in turn, the ultimately driven rotating element or roll during the latter's dynamic operation. Such variable speed changes could only be accomplished by employing a transmission of some variety in the power train or possibly by varying the speed of the power source itself or by braking the rotating element or roll. At best, such methods of varying speed are crude and are incapable of fine control.

In an article by Miller et al., Register Change on the Go With a High-gain Differential, appearing in Power Transmission Design, December 1965, a harmonic drive arrangement was described for adjusting the position of the impression on printing press rolls. In that arrangement, the rigid circular spline member is the drive element, the flexible spline member is the driven element and the wave generator is held stationary by an electric brake arrangement. As described, the rigid circular spline member is driven by a rather cumbersome bell housing which is driven at a constant speed. The flexible spline member drives a rigid shaft which, in turn, drives the rotating element, which in this case is the printing press roll. When it is desired to vary the impression position, the electric braking arrangement of the wave generator is released, and while the bell housing continues to drive the rigid circular spline, the wave generator is driven at a preselected speed by a separate power source until the impression is properly positioned. When the impression is positioned the wave generator is stopped and braked.

Due to the bell housing, output shaft, etc. the aforementioned arrangement is cumbersome. Moreover, due to its cumbersome nature and because the outer rigid circular spline member is the driving member while the flexible spline member is the driven member, the arrangement is incapable of being located proximate or inside the rotating element itself which is ultimately driven. Thus, a separate output drive shaft is necessitated between the flexible spline member and the rotating element.

My improved method and arrangement overcome the disadvantages of the aforementioned devices without sacrificing their advantages e.g. their extremely low backlash level and effective speed reduction capability.

More particularly, my improved arrangement and method are capable of rapidly and continuously varying and controlling the speed of a rotating element with a fine degree of accuracy while the element is in continuous high speed dynamic rotation. This is particularly important in applications such as where the rolls of a web printing press are to be controlled. In such presses, the tension and position of the web must be accurately controlled within extremely fine tolerances at all times to avoid mis-printing and/or miscutting.

Moreover, my improved arrangement and method make possible the location of the entire harmonic drive structure within the rotating element or roll. Thus, a compact unit is provided and torsional losses and the use of elaborate drive trains and gearing is minimized. As a consequence, cost of maintenance and repair, power input requirements and space loss are reduced with respect to prior known arrangements. Also, since torsional losses are minimized, finer accuracy of control is realized.

SUMMARY OF THE INVENTION

In a particular aspect, the invention comprises an arrangement and method wherein a rigid circular spline member is firmly affixed to a rotating element which is ultimately desired to be controllably rotated. A first drive means, rotating at a constant speed, rotates a flexible spline member which is surround by the rigid circular spline member. The rigid circular spline member includes inwardly extending splines which mate with outwardly extending splines on the flexible spline member at points of deformation of the latter member, such deformation being caused by a non-circular wave generator disposed within the flexible spline member. Rotation of the flexible spline member by the first drive means causes rotation at a given speed of the circular spline member and the rotating elmeent. To vary the speed of the latter from the given speed, the wave generator is rotated at a variable speed by a second drive means.

These and other objects, features and advantages of the present invention will be evident when considering the following detailed description.

BRIEF DESCRIPTION OF THE DRAWINGS

In the course of this description, reference will be made to the attached drawings in which.

DESCRIPTION OF THE PREFERRED EMBODIMENT

Figure 1:
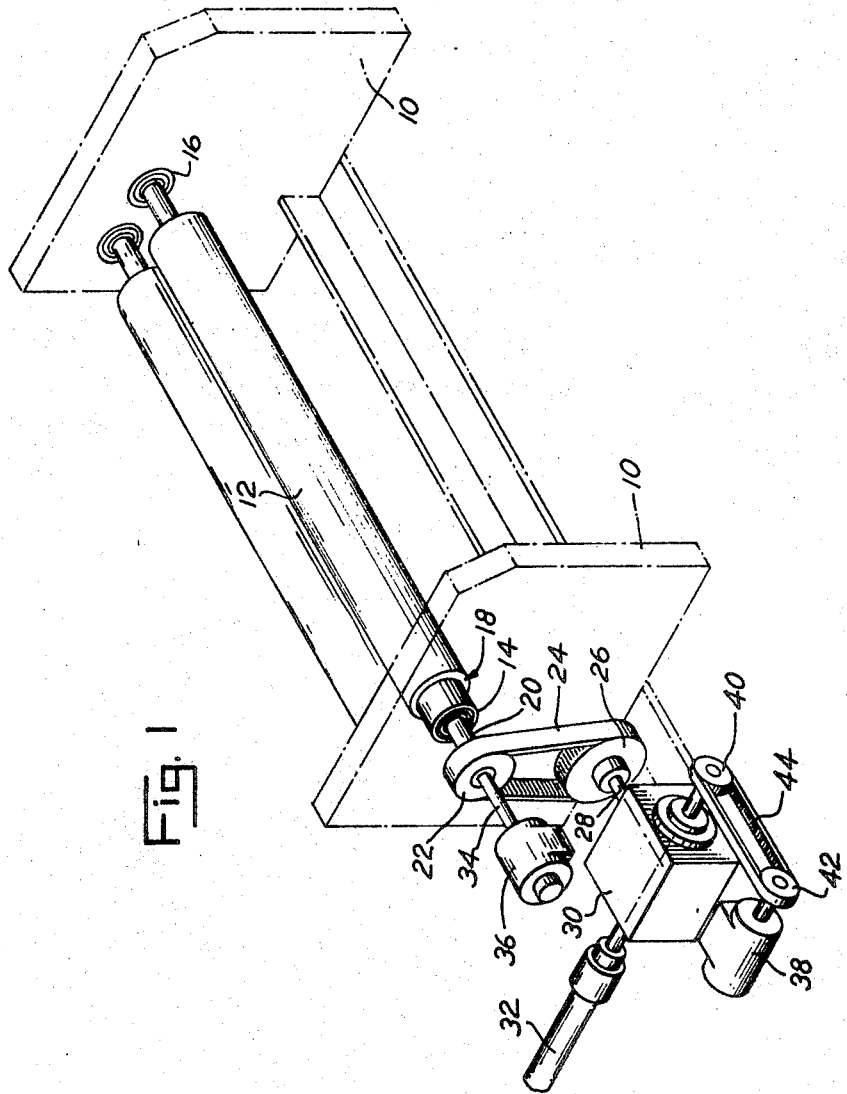
FIG. 1 is an overall view of the harmonic drive of the present invention showing its location with respect to a printing press roll.

Referring to FIG. 1, an overall view of the harmonic drive of the present invention is shown installed in a rotating roll assembly, such as the roll of a web type printing press. A frame 10 is provided and the roll 12 is mounted thereon on roller support bearings 14 and 16. The harmonic drive 18 is mounted in one end of the roll. A constant speed input shaft 20 is associated with the harmonic drive 18 in a driving relationship. The constant speed input shaft 20 is driven by a gear 22 which, in turn, is driven, via a drive belt 24, by a gear 26 mounted on a shaft 28 driven from a right angle gear box 30. Constant speed power is provided to the right angle gear box 30 by a suitable drive shaft 32. Journaled concentrically within the constant speed input shaft 20, is a variable speed shaft 34 which is driven by a variable speed motor 36. To vary the speed of the variable speed motor 36, a tachometer 38 is provided which is driven off the right angle gear box 30 via suitable gears 40 and 42 and drive belt 44. The tachometer 38, via appropriate electrical or mechanical linkage (not shown) with the variable speed motor, provides information to the variable speed motor to control its speed, and, in turn, control the speed of the roll 12.

Figure 2:
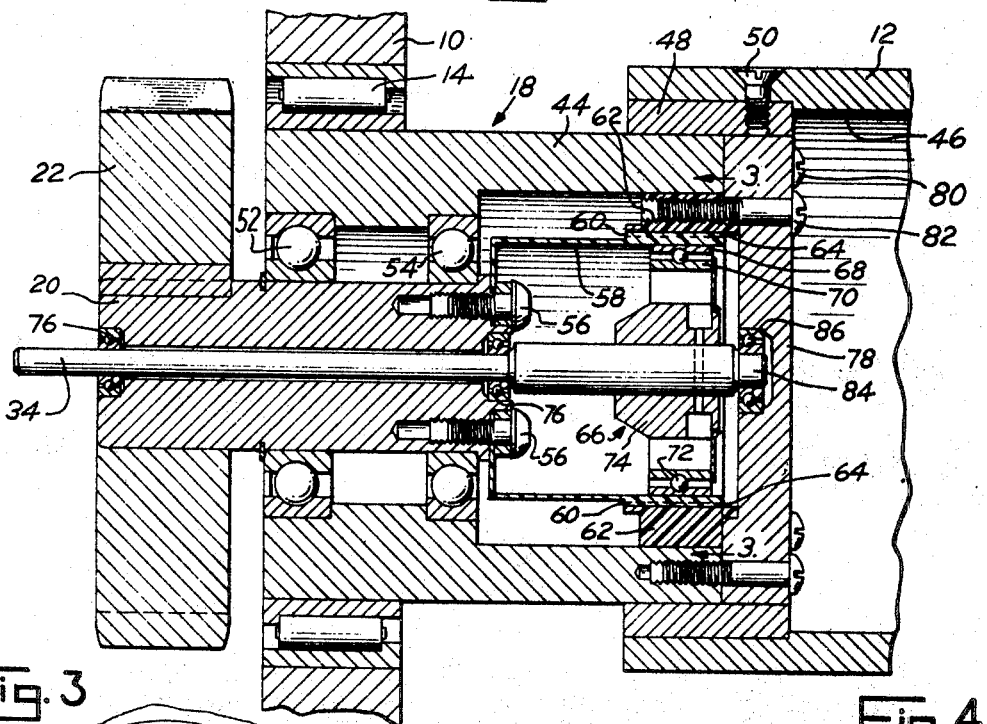
FIG. 2 is an elevation cross-sectioned view of the harmonic drive of the present invention.
Figure 3:
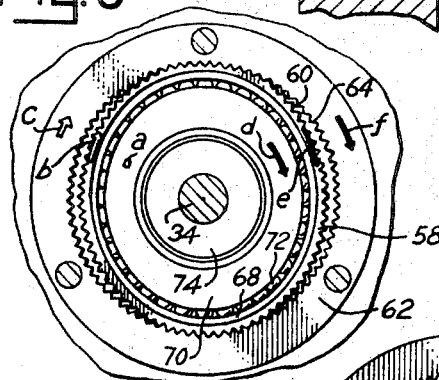
FIG. 3 is an end cross-sectioned view of the harmonic drive taken along line 3—3 of FIG. 2 and showing vectors depicting the direction and rate of speed of the various component elements when the drive is operating at normal speed.

The harmonic drive arrangement of the present invention is shown in detail in FIGS. 2 and 3. The harmonic drive 18 is disposed in one end of the roll 12 and includes a housing 44, one end of which is rigidly attached to the inner surface 46 of the roll 12 and the other end of which is mounted in the frame 10. The housing 44 may be either rigidly attached directly to the inner surface 46 of the roll or may be rigidly attached to a shim member 48 which in turn is rigidly attached to inner surface 46 of the roll by suitable means, for example bolts 50. The use of the shim member 48 is desirable, since a housing of a given diameter may be readily adapted thereby to fit rolls of different inner diameters. Appropriate bearings 14 are provided between the housing 44 and the frame 10 since the housing rotates during operation. The constant speed input shaft 20 is concentrically mounted in one end of the housing 44 and rides upon bearings 52 and 54 therebetween. Firmly mounted upon one end of the constant speed input shaft 20, is the drive gear 22. Firmly affixed to the other housing end of the constant speed input shaft 20 by bolts 56, is a flexible splines member 58. The flexible spline member 58 is substantially cup-shaped and is constructed of a resilient material, for example a steel material or a suitable synthetic polymeric material. The flexible spline member 58 carries a plurality of substantially equally spaced splines 60 about its outer periphery at its open end. Arranged generally concentrically about the splines 60 of the flexible spline member 58 is a rigid circular spline member 62. The rigid circular spline member 62 is firmly affixed to the inner surface of the roll 46 via the housing 44 and shim member 48. The rigid circular spline memer 62 carries a plurality of substantially equally spaced splines 64 about its inner periphery. Since the diameter of the rigid circular spline member 62 is greater than that of the flexible spline member 58, the number of splines 64 carried by the former is slightly greater than the number of splines 60 carried by the latter.

Disposed within and at the open end of the cup-shaped flexible spline member 58 is a wave generator 66. The wave generator 66 includes a resilient outer bearing race 68 and a rigid non-circular generally oval-shaped inner bearing race 70 with a plurality of ball bearings 72 disposed therebetween and held by the bearing races. The outer bearing race 68 is affixed to the inner surface of the cup-shaped flexible spline member 58 and is adapted to rotate with the flexible spline member. The outer bearing race 68 may be constructed of a flexible metallic band material or a suitable flexible polymeric substance. The inner rigid bearing surface 70 is rigidly attached to a boss 74 which, in turn, carries the variable speed shaft 34 journaled therein. The variable speed shaft 34 extends outwardly of the housing 44 through the center of the constant speed input shaft 20 and drive gear 22; the variable speed shaft 34 being journaled through the constant speed input shaft 20. The variable speed shaft 34 is adapted to rotate independently of the constant speed input shaft 20 and thus, is provided with suitable bearings 76 mounted in the constant speed input shaft 20. To prevent dirt and other foreign material from entering the harmonic drive arrangement and to provide for the rigid attachment of the rigid circular spline member 62 to the housing 44, an end plate 78 is preferably provided. The end plate 78 is firmly attached to the end of the housing 44 and the rigid circular spline member 62 by bolts 80 and 82, respectively. To provide adequate support for the variable speed shaft 34, the variable speed shaft may include a portion 84 which is extended beyond the boss 74 and the extended end portion is carried by bearings 86 located in the end plate 78.

Referring particularly to FIG. 3, since the wave generator 66 is not circular, but more or less oval in shape, the rigid inner bearing race 70 of the wave generator deforms the flexible spline member 58. The degree of deformation of the flexible spline member 58 is such that its splines 60 engage the splines 64 of the rigid circular spline member 62 over an arcuate portion of the circumference of the circular spline member 62.

For the purpose of clarity, a detailed description of operation follows:

OPERATION

The overall machine of which the roll 12 is an integral part, is started. Power is supplied through the drive shaft 32 to the right angle gear box 30 which, in turn, drivingly rotates the constant speed input shaft 20 via shaft 28, gear 26, drive belt 24 and gear 22. The gear 22 is rotated at a constant speed, thus rotating the constant speed input shaft 20 and the flexible spline member 58. Since the wave generator 66 has deformed the flexible spline member 58, due to its generally oval shape, some of the splines 60 of the flexible spline member 58 engage the splines 64 of the rigid circular spline member 62. Because the splines are so engaged, the rigid circular spline member 62 is drivingly rotated by the flexible spline member 58. The rigid circular spline member 62, being firmly affixed to the housing 44 which, in turn, is firmly affixed to the inner surface 46 of the roll 12, drives the roll 12 at a predetermined speed. As in conventional gearing arrangements, a speed reduction is realized between the flexible spline member 58 and the rigid circular spline member 62 due to the difference in the number of splines between the two members.

During the aforementioned operation, the wave generator 66 may either be held stationary or may rotate at the same speed as the flexible spline member 58.

Figure 4:
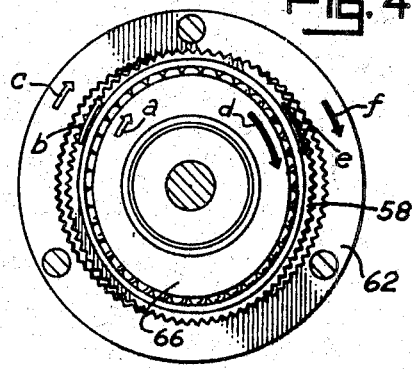
FIG. 4 is a simplified end view of the harmonic drive showing vectors depicting the direction and rate of speed of the component elements when the speed of the drive is increased.
Figure 5:
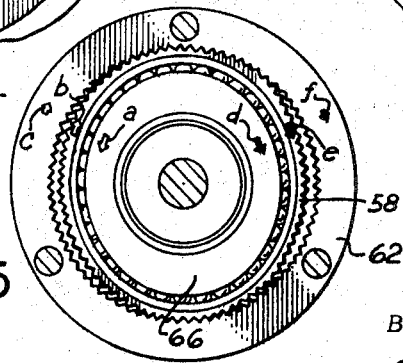
FIG. 5 is a simplified end view of the harmonic drive showing vectors depicting the direction and rate of speed of the component elements when the speed of the drive is decreased.

Referring to FIGS. 3-5, the direction of rotation and the relative speeds of the flexible spline member 58, the rigid circular spline member 62 and the wave generator 66 are depicted by the light and solid vector-like arrows $a$, $b$, $c$, and $d$, $e$, $f$, respectively. The light vector-like arrows $a$, $b$, $c$ depict the condition of the various members where the wave generator 66 is stationary during normal operation. The solid vector-like arrows $d$, $e$, $f$ depict the condition of the various members where the wave generator 66 rotates at the same speed as the flexible spline member 58 during normal operation.

In FIG. 3 the harmonic drive of the present invention is shown operating at normal constant speed. Where the wave generator 66 is held stationary, the light vector-like arrow $a$ (without an arrowhead) indicates the wave generator 66 is stopped; the light vector-like arrow $b$ indicates the flexible spline member 58 is rotating clockwise at a given constant speed; and the light vector-like arrow $c$ indicates the rigid circular spline member 62 is rotating clockwise but at a speed somewhat less than the speed of the flexible spline member 58 due to the difference in the number of splines between the two last mentioned members. Where the wave generator 66 rotates at the same speed as the flexible spline member 58, the solid vector-like arrows $d$ and $f$ show the wave generator 66 and the rigid circular spline member 62, respectively, to both be rotating clockwise at the same speed and the flexible spline members 58 to be rotating slightly faster than the latter two members due to the addition effect of the wave form which is caused by the wave generator rotation. Even though the flexible spline member 58 has fewer splines than the rigid circular spline member 62, the wave form produced by the rotating wave generator 66 cancels the speed ratio effect of the splines.

Now, it shall be assumed that the roll 12 is rotating at a speed which is slower than that desired. Therefore, its speed must be increased. The tachometer 38 senses the undesirably low roll speed and orders the variable speed motor 36 to rotate. Since it is desired to speed up the roll, the variable speed motor 36 rotates the variable speed input shaft 34 which, in turn, rotates the wave generator 66 in the same direction that the flexible spline member 58 is rotating, the latter rotation being effected by the continued driving of the constant speed input shaft 20.

If the wave generator 66 has been held stationary, it is now rotated in the same direction as the flexible spline member 58 at a speed such that the sum of the effect of the wave form produced by the wave generator 66 and the rotation of the flexible spline member 58 by the constant speed input shaft 20 produces a speed or rotation of the rigid circular spline member 62 which is equal to the increased speed desired. If the wave generator 66 has previously been rotating at the same speed as the flexible spline member 58, its speed is increased to produce the same summation of speed result.

The conditions of the various elements of the harmonic drive in the speed-up state are shown in FIG. 4. Where the wave generator 66 has been previously held stationary, the wave generator is released and rotated in a clockwise direction by the variable speed motor 36, as shown by the light vector-like arrow $a$. The rotation of the wave generator 66 sets up a wave form in the flexible spline member 58. Since the flexible spline member continues to be physically rotated by the constant speed input shaft 20, the wave form adds to the speed of the flexible spline member 58 and the sum results in a net clockwise rotation of the flexible spline member 58 at a greater speed, as shown by the light vector-like arrow $b$. As shown by the light vector-like arrow $c$, the speed of the rigid circular spline member 62 is also increased in the clockwise direction. Since the latter member is rigidly attached to the roll 12, the speed of the roll is also increased. Again, the overall speed of the rigid circular spline member 62 will be less than the speed of the flexible spline member 58 due to the difference in the number of splines between the two members. Where the wave generator 66 has been previously rotating at the same speed as the flexible spline member 58, the speed of rotation of the wave generator is increased by the variable speed motor 36, as shown by the solid vector-like arrow $d$. The increased rotational speed of the wave generator 66 sets up a wave form in the flexible spline member 58. Since the flexible spline member continues to be physically rotated by the constant speed input shaft 20, the wave form also adds to the speed of the flexible spline member 58 and the sum again results in a net clockwise rotation of the flexible spline member at a greater speed than its previous normal speed, as shown by the solid vector-like arrow $e$. As shown by the solid vector-like arrow $f$, the speed of the rigid circular spline member 62 is also increased in the clockwise direction. For the reasons mentioned hereinabove, the speed of the roll 12 is thereby increased, but to a speed which is somewhat less than the speed of rotation of the flexible spline member 58.

Now, let us assume that the roll 12 has been rotating at a speed which is greater than that desired. Therefore, its speed must be decreased. Again, tachometer 38 senses the undesirable high roll speed and orders the variable speed motor 36 to change the speed of the variable speed input shaft 34. The variable speed motor 36, via the variable speed input shaft 34, either rotates the wave generator 66 in a direction opposite to the rotation of the flexible spline member 58 or continues to rotate the wave generator in the same direction as the flexible spline member but at a decreased speed. If the wave generator 66 has been held stationary, it is rotated in a direction opposite the rotation of the flexible spline member 58 at a speed such that the difference of the effect of the wave form produced by the wave generator 66 and the rotation of the flexible spline member 58 by the constant speed input shaft 20 produces a speed of rotation of the rigid circular spline member 62 which is equal to the decreased speed desired. If the wave generator 66 has previously been rotating at the same speed as the flexible spline member 58, its speed is decreased to produce the same difference of speed result.

The condition of the various elements of the harmonic drive in the slow-down state are shown in FIG. 5. Where the wave generator 66 has been previously held stationary, the wave generator is now rotated in a counterclockwise direction by the variable speed motor 36 as shown by the light vector-like arrow a. The rotation of the wave generator 66 sets up a wave form in flexible spline member 58. Since the flexible spline member continues to be physically rotated in a clockwise direction by the constant speed input shaft 20, the wave form subtracts from the speed of the flexible spline member 58 and the difference results in a continued net clockwise rotation of the flexible spline member but at a speed less than before, as shown by the light vector-like arrow b. As shown by the light vector-like arrow c, the speed of the rigid circular spline member 62 is also decreased in the clockwise direction. Since the latter member is directly attached to the roll 12, the speed of the roll is also decreased. Again the overall speed of the rigid circular spline member 62 will be less than the speed of the flexible spline member 58 due to the difference in the number of splines between the two members. Where the wave generator 66 has been previously rotating at the same speed as the flexible spline member 58, the speed of rotation of the wave generator is decreased by the variable speed motor 36, as shown by the solid vector-like arrow d. The decreased rotational speed of the wave generator 66 sets up a wave form in the flexible spline member 58. Since the flexible spline member continued to be physically rotated by the constant speed input shaft 20, the wave form also subtracts from the speed of the flexible spline member 58 and the difference again results in net clockwise rotation of the flexible spline member but at a lesser speed, as shown by the solid vector-like arrow e. As shown by the solid vector-like arrow f, the speed of the rigid circular spline member 62 is also decreased but continues to rotate in a clockwise direction. The speed of the roll 12 is thereby decreased.

Although the various elements of the harmonic drive have been described as rotating in the clockwise direction, it will be evident that the direction of rotation of the elements may be reversed without loss of performance or result. Moreover, it should be understood that the vector-like arrows a–f appearing in FIGS. 3–5, are not intended to be true vectors as such. They are merely intended to clarify the operation by depicting the relative direction of rotation and speed relationships of the various elements in a qualitative sense, rather than an absolute quantitative sense.

The following table shows, by way of example, the resulting speeds of the rigid circular spline member 62 and its rigidly attached roll 12 when the wave generator 66 is rotated at various speeds. The speed figures hereinafter recited, are the result of a harmonic drive in which the flexible spline member 58 was driven at 1000 r.p.m. and carried 160 splines and the rigid circular spline member 62 carried 162 splines.

| Speed wave generator (r.p.m.): | Speed circular spline (r.p.m.) |
|---|---|
| 2100 opposite | 961.729 |
| 2000 opposite | 862.963 |
| 1900 opposite | 964.198 |
| 1800 opposite | 965.432 |
| 1700 opposite | 966.667 |
| 1600 opposite | 967.901 |
| 1500 opposite | 969.136 |
| 1400 opposite | 970.370 |
| 1300 opposite | 971.605 |
| 1200 opposite | 972.840 |
| 1100 opposite | 974.074 |
| 1000 opposite | 975.309 |
| 900 opposite | 976.543 |
| 800 opposite | 977.778 |
| 700 opposite | 979.012 |
| 600 opposite | 980.247 |
| 500 opposite | 981.482 |
| 400 opposite | 982.716 |
| 300 opposite | 983.951 |
| 200 opposite | 985.185 |
| 100 opposite | 986.420 |
| 50 opposite | 987.037 |
| 0 opposite | 987.654 |
| 50 same | 988.272 |
| 100 same | 988.889 |
| 200 same | 990.123 |
| 300 same | 991.358 |
| 400 same | 992.593 |
| 500 same | 993.827 |
| 600 same | 995.062 |
| 700 same | 996.296 |
| 800 same | 997.531 |
| 900 same | 998.765 |
| 1000 same | 1000.000 |
| 1100 same | 1001.235 |
| 1200 same | 1002.469 |
| 1300 same | 1003.704 |
| 1400 same | 1004.938 |
| 1500 same | 1006.173 |
| 1600 same | 1007.407 |
| 1700 same | 1008.642 |
| 1800 same | 1009.876 |
| 1900 same | 1011.111 |
| 2000 same | 1011.346 |
| 2100 same | 1013.580 |

The description of speed of the wave generator as "opposite" and "same" connotes the direction of rotation of the wave generator with respect to the direction of rotation of the flexible spline member.

Although the operation of the harmonic drive of my invention has been descrbed in terms of the wave generator being either fixed or rotating at the same speed as the flexible spline member, it should be understood that any speed state of rotation of the wave generator may be selected as a "normal speed" condition, the "speed-up" or "slow-down" conditions being achieved by variation of the wave generator speed from said selected speed state. This will be particularly evident when considering the above table.

When considering the detailed description of the preferred embodiment of my invention, it will be readily apparent that the method and arrangement of my invention retains the many advantages of prior harmonic drive arrangements, for example extremely low back lash levels. In addition my method and arrangement are capable of rapidly and continuously varying and controlling the speed of a rotating element or roll with a fine degree of accuracy while the element or roll continues to rotate in a high speed dynamic condition. This will be readily evident when considering the above table. Moreover, my arrangement is extremely compact even to the extent that it may be inserted in the end of the rotating element or roll itself.

It is to be understood that the embodiment of the invention which has been described is merely illustrative of the principles of the invention. Numerous modifications may be made by those skilled in the art without departing from the true spirit and scope of the invention.

What is claimed is:

1. A harmonic drive for accurately controling the speed of a rotatable element adapted to be rotated at a high speed, including,
   a first rotatable shaft,
   a substantially cylindrical flexible spline member attached to an end of said first shaft and adapted to rotate therewith, said flexible spline member having a plurality of splines about its external circumference, a substantially rigid circular spline member concentrically arranged about said flexible spline member and attached to the rotatable element for rotation therewith, said circular spline member having a plurality of splines on its inner circumference, a wave generator disposed within and engaging the interior surface of said cylindrical flexible spline member and deforming the flexible spline member in at least one direction by an amount such that the splines of the flexible spline member drivingly engage the splines of the circular spline member to rotate said rotatable element at said high speed, a second rotatable shaft attached to said wave generator, first drive means associated with said first rotatable shaft for rotating said first rotatable shaft and said cylindrical flexible spline member at a first constant predetermined speed and for normally rotating said circular spline member at a normally constant predetermined speed, and second drive means associated with said second rotatable shaft for selectively rotating said second shaft at a variable speed to change said normally constant predetermined speed of said circular spline member while said first drive means continues to rotate said first shaft and cylindrical flexible spline member at said first constant predetermined speed, said first and second shafts being concentrically arranged with respect to each other.

2. The harmonic drive of claim 1 wherein said rotatable element is a generally cylindrical tubular roll, said rigid circular spline being firmly attached in a driving relationship to the inner surface of said roll.

3. The harmonic drive of claim 2 including a housing enclosing said flexible spline and rigid circular spline members, said housing being firmly attached to and between said circular spline and the inner surface of said roll in said driving relationship.

4. The harmonic drive of claim 2 wherein at least a part of said flexible and rigid circular spline members are disposed within said generally cylindrical tubular roll.

References Cited

UNITED STATES PATENTS

| | | | |
|---|---|---|---|
| 2,889,716 | 6/1959 | Doty | 74—689 |
| 2,931,249 | 4/1960 | Musser | 74—640 |
| 3,214,999 | 11/1965 | Lapp | 74—675 |

ARTHUR T. McKEON, Primary Examiner

U.S. Cl. X.R.

74—640